United States Patent
Morita et al.

(10) Patent No.: US 7,612,534 B2
(45) Date of Patent: Nov. 3, 2009

(54) CAPACITY ADJUSTMENT APPARATUS AND METHOD OF SECONDARY BATTERY

(75) Inventors: Tsuyoshi Morita, Kanagawa (JP); Takeshi Miyamoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 391 days.

(21) Appl. No.: 11/785,078

(22) Filed: Apr. 13, 2007

(65) Prior Publication Data
US 2007/0247117 A1    Oct. 25, 2007

(30) Foreign Application Priority Data
Apr. 14, 2006    (JP) .............................. 2006-111896

(51) Int. Cl.
*H01M 10/44*    (2006.01)
*H01M 10/46*    (2006.01)
(52) U.S. Cl. .......................................... 320/132
(58) Field of Classification Search ................ 320/107, 320/110, 116, 118, 119, 121, 132, 149
See application file for complete search history.

(56) References Cited

U.S. PATENT DOCUMENTS

| | | | | |
|---|---|---|---|---|
| 6,124,698 A | * | 9/2000 | Sakakibara | 320/110 |
| 6,932,174 B2 | * | 8/2005 | Hirata et al. | 320/104 |
| 7,196,496 B2 | * | 3/2007 | Yamada et al. | 320/149 |
| 2003/0001544 A1 | * | 1/2003 | Nakanishi | 320/162 |
| 2006/0043934 A1 | | 3/2006 | Sugimoto | |
| 2007/0247116 A1 | | 10/2007 | Morita et al. | |

FOREIGN PATENT DOCUMENTS

| | | |
|---|---|---|
| JP | 2003 0259549 A | 9/2003 |
| JP | 2003-284253 A | 10/2003 |

OTHER PUBLICATIONS

U.S. Appl. No. 11/785,066, filed Apr. 13, 2007, Tsuyoshi Morita et al.

* cited by examiner

*Primary Examiner*—Edward Tso
(74) *Attorney, Agent, or Firm*—Foley & Lardner LLP

(57) ABSTRACT

In secondary battery capacity adjustment apparatus and method for an assembled cell unit, the assembled cell unit includes: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, a priority order of the secondary batteries to be capacity adjusted is determined in accordance with a mounted position of the capacity adjusting section corresponding to one of the secondary batteries on the control board and an electric power of each of the secondary batteries is caused to have consumed by the corresponding capacity adjusting section in accordance with the determined priority order to adjust a capacity of each of the secondary batteries.

10 Claims, 8 Drawing Sheets

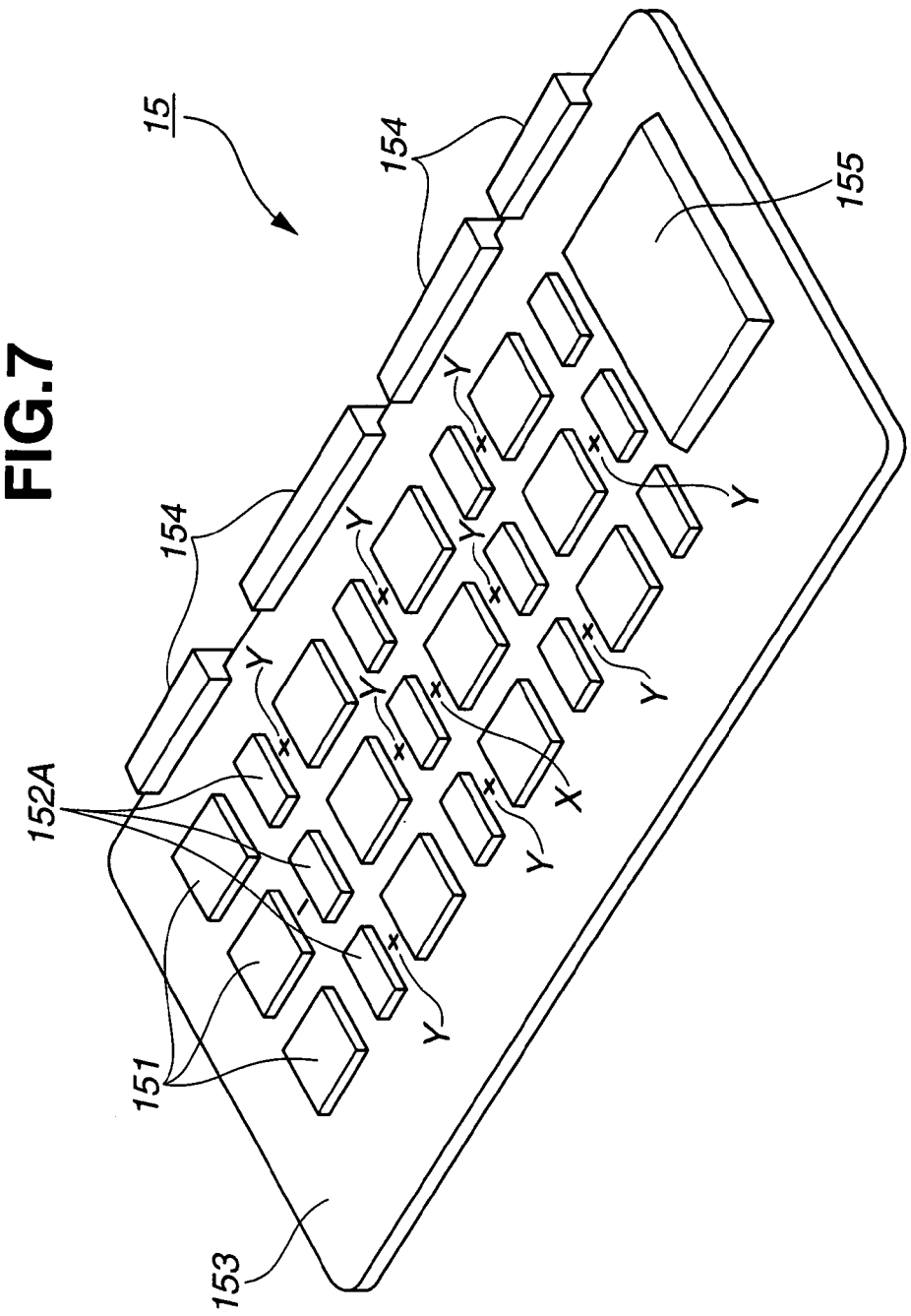

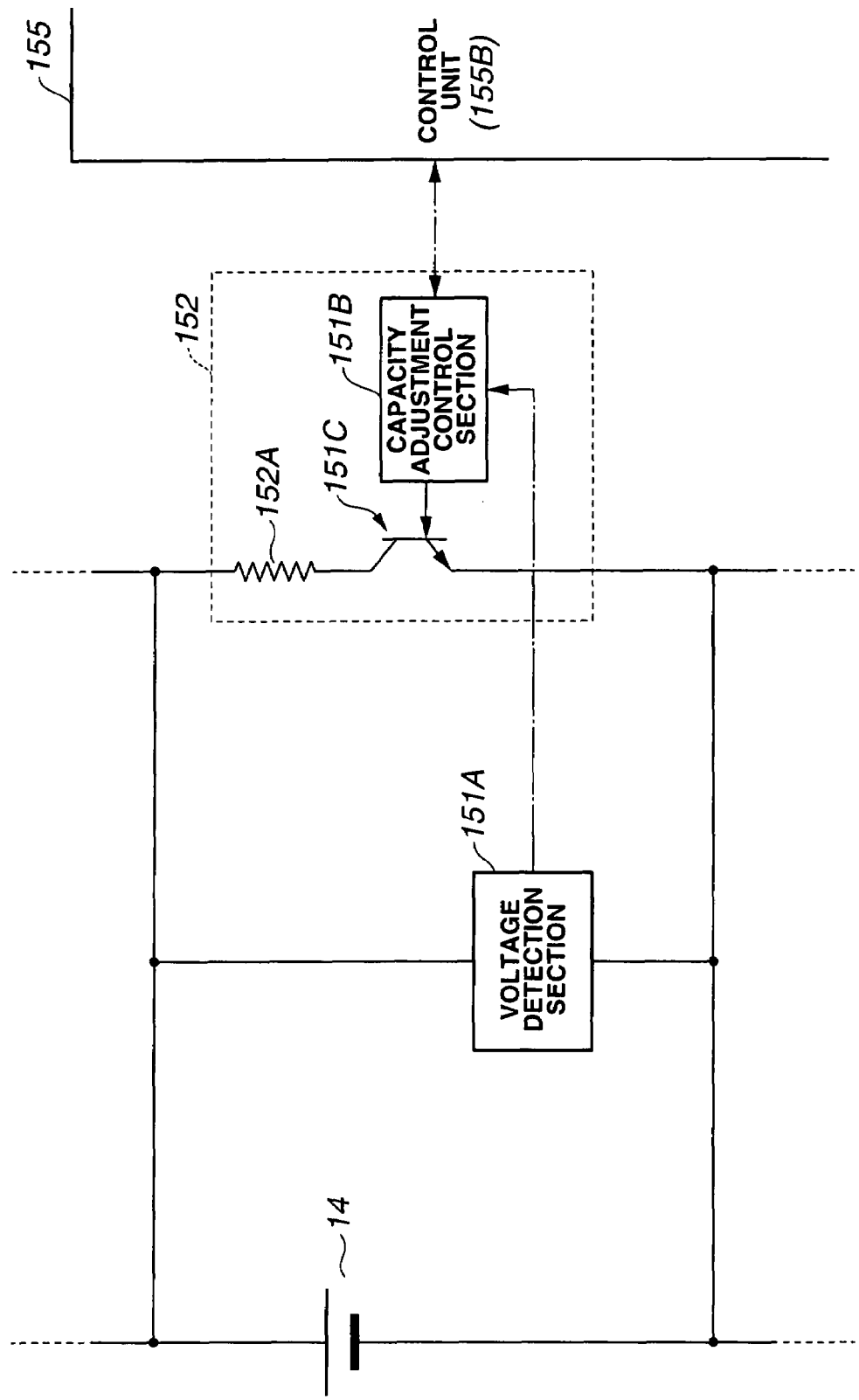

CAPACITY ADJUSTMENT APPARATUS AND METHOD OF SECONDARY BATTERY

BACKGROUND OF THE INVENTION (1) Background of the Invention

The present invention relates to apparatus and method for adjusting capacities of secondary batteries.

(2) Description of Related Art

In assembled cells in which a plurality of cells (secondary batteries) are connected, differences in the capacities (residual capacities, hereinafter, described merely as capacities) of the respective cells occur due to variations in characteristics of the respective cells when charges and discharges are repeated and when the assembled cells are left alone. In a state where the assembled cells are used when such capacity differences as described above occur, some cells in states of overcharges and overdischarges are developed so that a life of a whole of the assembled cells becomes short. Therefore, uniformities of capacities of the respective cells are carried out at predetermined frequencies.

In a lithium ion secondary battery in which lithium cobalt oxide is used for a positive pole and carbon is used for a negative pole and in a lithium secondary battery in which lithium secondary battery in a lithium secondary battery in which lithium cobalt oxide is used for the positive pole and a lithium metal is used for the negative pole (hereinafter, these lithium ion secondary battery and lithium secondary battery are, in a general term, also called a lithium series secondary battery), such an organic solvent as ethylene carbonate is used for an electrolyte. Hence, if the lithium series secondary battery overcharges, the organic solvent is decomposed and gasified. A frame of each secondary battery is expanded and the organic solvent which is the electrolyte is gasified. Hence, when the subsequent charge is carried out, a charge capacity is extremely reduced due to a full capacity thereof caused by a deterioration of the secondary battery.

To cope with the above-described problem, in the assembled cell of the lithium series secondary battery, such a method in which the capacity of each cell is uniformed by discharging the cells having larger capacities than the other cells has been adopted. For example, a Japanese Patent Application Publication No. 2003-284253 published on Oct. 3, 2003 discloses a method of calculating the adjustment quantity of each cell from a deviation between open voltage values of the individual cells and 1/x of a voltage value of a minimum voltage value B added to a maximum voltage value A from among the individual open voltage values (x denotes a constant between $(A+B)/A$ and $(A+B)/B$). It should be noted that the capacity adjustment of the cell is carried out by discharging a capacity adjustment bypass resistor connected in parallel to each cell by a time duration corresponding to an adjustment capacity.

SUMMARY OF THE INVENTION

However, since a heat generation quantity due to the discharge becomes excessive if the discharge is carried out for a multiple number of capacity adjustment bypass resistors, there is a possibility of exerting an ill effect on such electronic parts as CPU (Central Processing Unit) and so forth mounted on a control board abutting the bypass resistors.

It is an object of the present invention to provide secondary battery capacity adjustment apparatus and method for an assembled cell unit which can execute the residual capacity adjustments of the respective secondary batteries in a time as short as possible without an occurrence of the overheat of the control board by controlling appropriately the heat generation quantity at the time of the residual capacity adjustments.

According to one aspect of the present invention, there is provided a secondary battery capacity adjustment apparatus for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment apparatus comprising: a priority order determining section configured to determine a priority order of the secondary batteries to be residual capacity adjusted in accordance with a mounted position of the capacity adjusting section corresponding to one of the secondary batteries to be residual capacity adjusted on the control board; and a secondary battery capacity adjusting section configured to have the electric power of each of the secondary batteries consumed by the corresponding capacity adjusting section in accordance with the determined priority order to adjust a residual capacity of each of the secondary batteries.

According to another aspect of the present invention, there is provided a secondary battery capacity adjustment method for an assembled cell unit, the assembled cell unit including: a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment method comprising: determining a priority order of the secondary batteries to be residual capacity adjusted in accordance with a mounted position of the capacity adjusting section corresponding to one of the secondary batteries on the control board; and having the electric power of each of the secondary batteries consumed by the corresponding capacity adjusting section in accordance with the determined priority order to adjust a residual capacity of each of the secondary batteries.

In the present invention, when the residual capacities of the respective secondary batteries constituting the assembled cell unit are adjusted, a priority order of the secondary batteries to be residual capacity adjusted is determined in accordance with mounted positions of capacity adjusting sections on the control board, the capacity adjusting sections being heat generation sources. In accordance with the mounted positions of the capacity adjusting sections has a meaning that, specifically, one or more of the capacity adjusting sections which are mounted at one or more positions difficult to exert a thermal influence on the other capacity adjusting sections have higher priority orders. Thus, the residual capacity adjustments can be executed without a local overheat of the control board.

This summary of the invention does not necessarily describe all necessary features so that the invention may also be a sub-combination of these described features. The other objects and features of this invention will become understood from the following description with reference to the accompanying drawings.

BRIEF DESCRIPTION OF THE DRAWINGS

FIG. 7 is a perspective view of the control board to which the secondary battery adjustment apparatus according to the present invention is applicable.

FIG. 8 is a schematic block diagram of each of capacity adjustment sections shown in FIG. 1.

DETAILED DESCRIPTION OF THE INVENTION

Reference will hereinafter be made to the drawings in order to facilitate a better understanding of the present invention.

Figure 1:
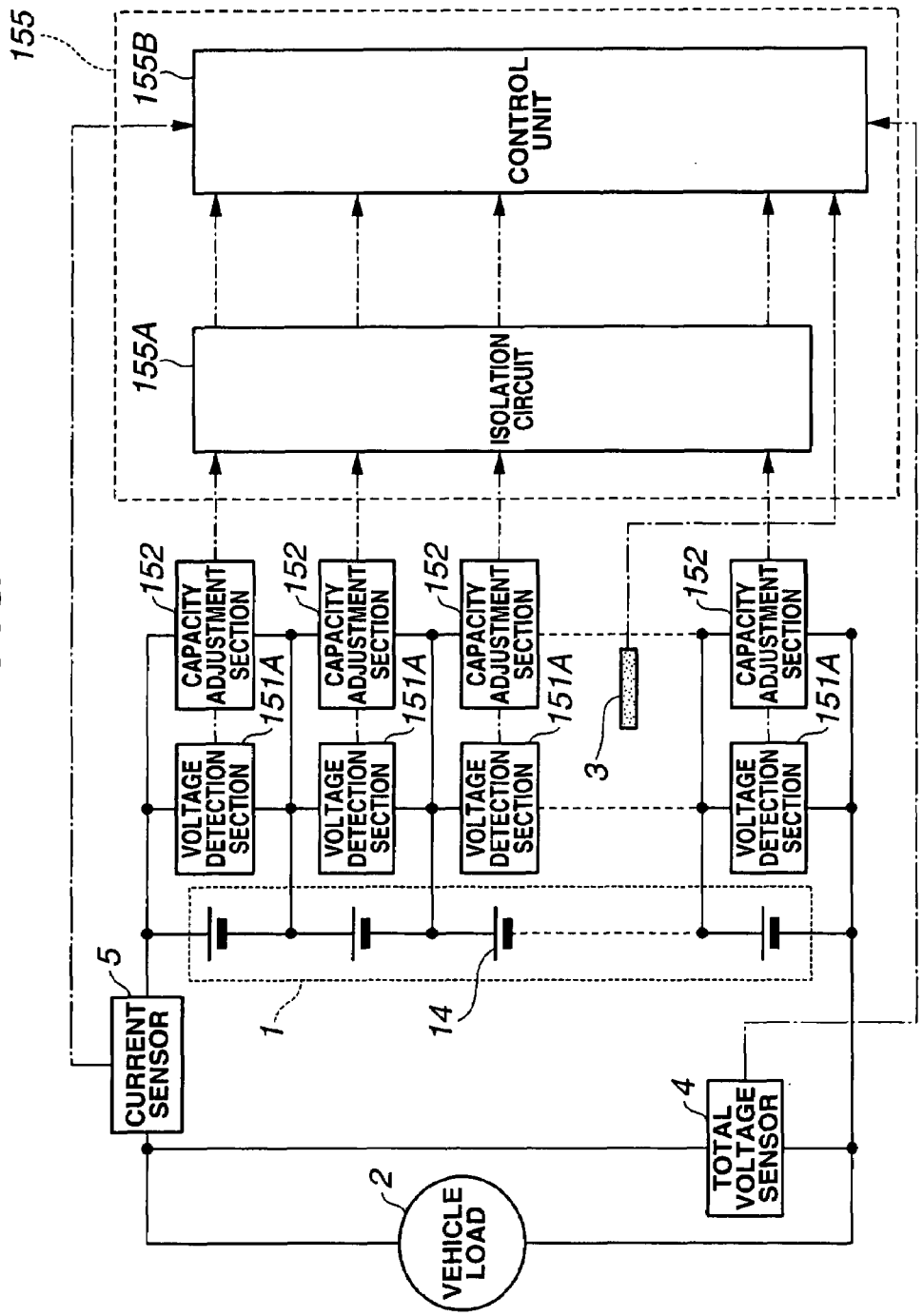
FIG. 1 is a schematic block diagram representing a preferred embodiment of a secondary battery capacity adjustment apparatus according to the present invention.
Figure 2:
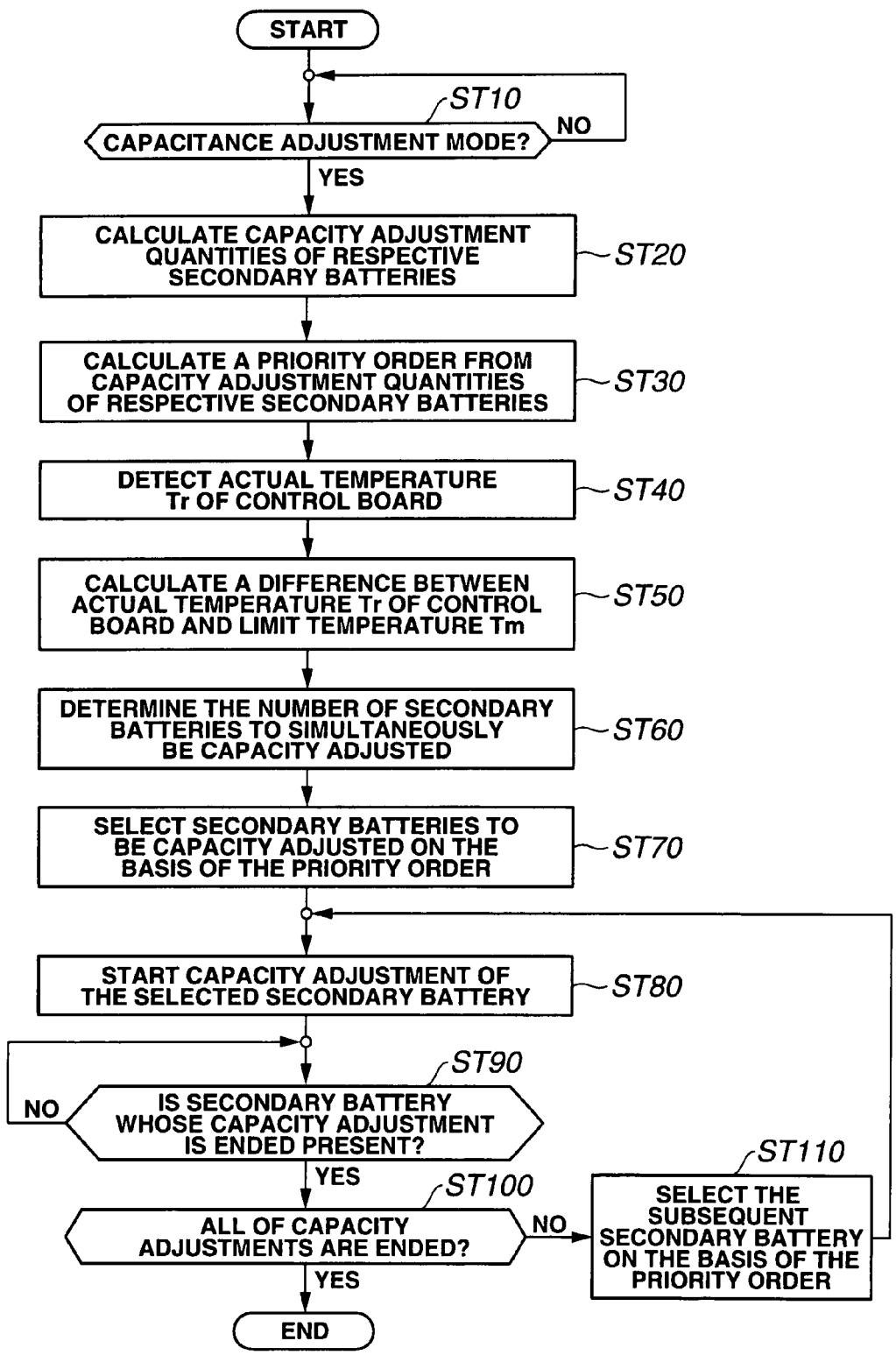
FIG. 2 is a flowchart representing an operation of the secondary battery capacity adjustment apparatus in the preferred embodiment shown in FIG. 1.
Figure 3:
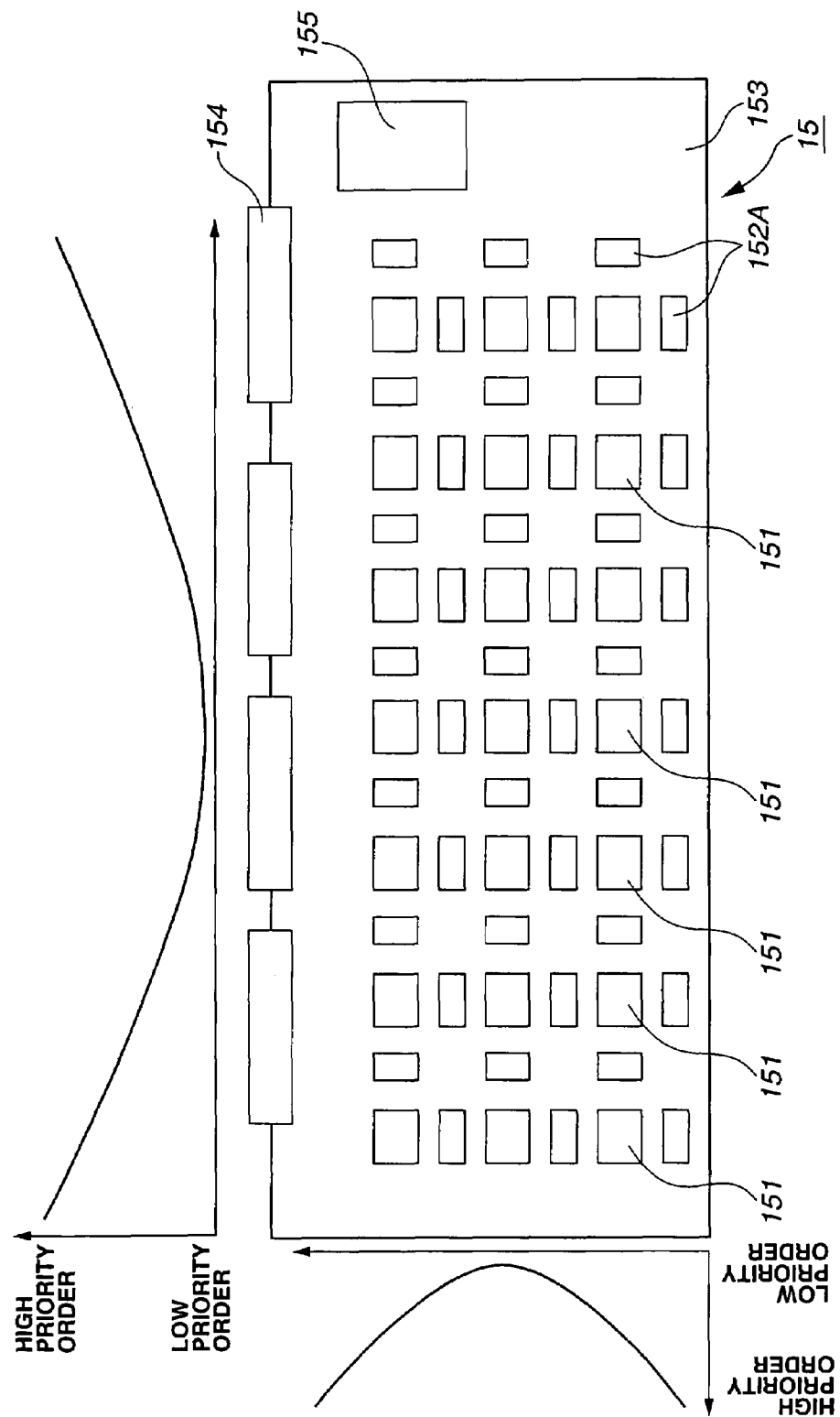
FIG. 3 is an explanatory view representing an example of a relationship between mounted positions of parts on a control board and priority orders of the secondary batteries to be capacity adjusted on the control board.
Figure 4:
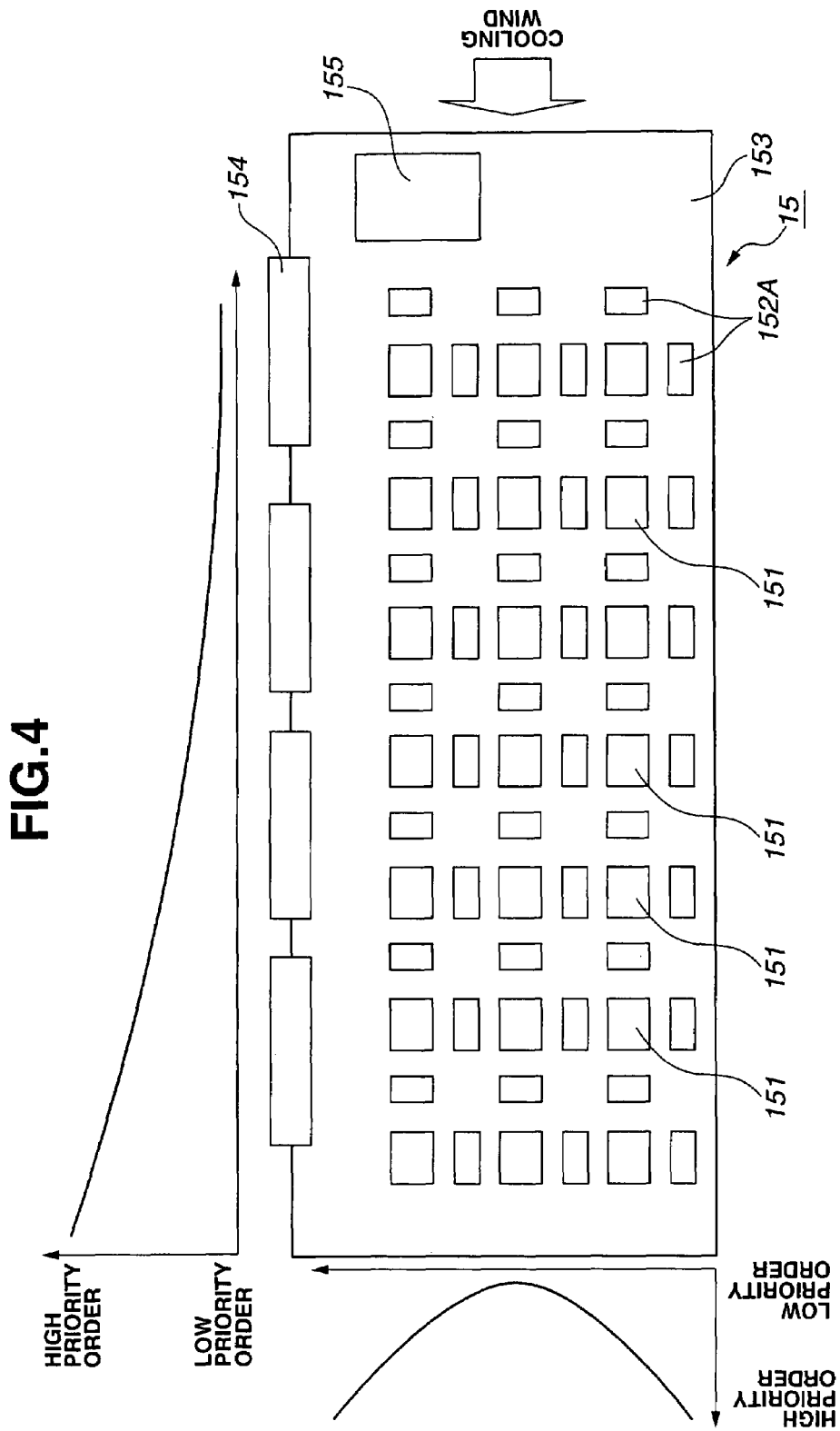
FIG. 4 is an explanatory view representing another example of a relationship between mounted positions of parts and the priority order of the secondary batteries to be capacity adjusted on the control board.
Figure 5:
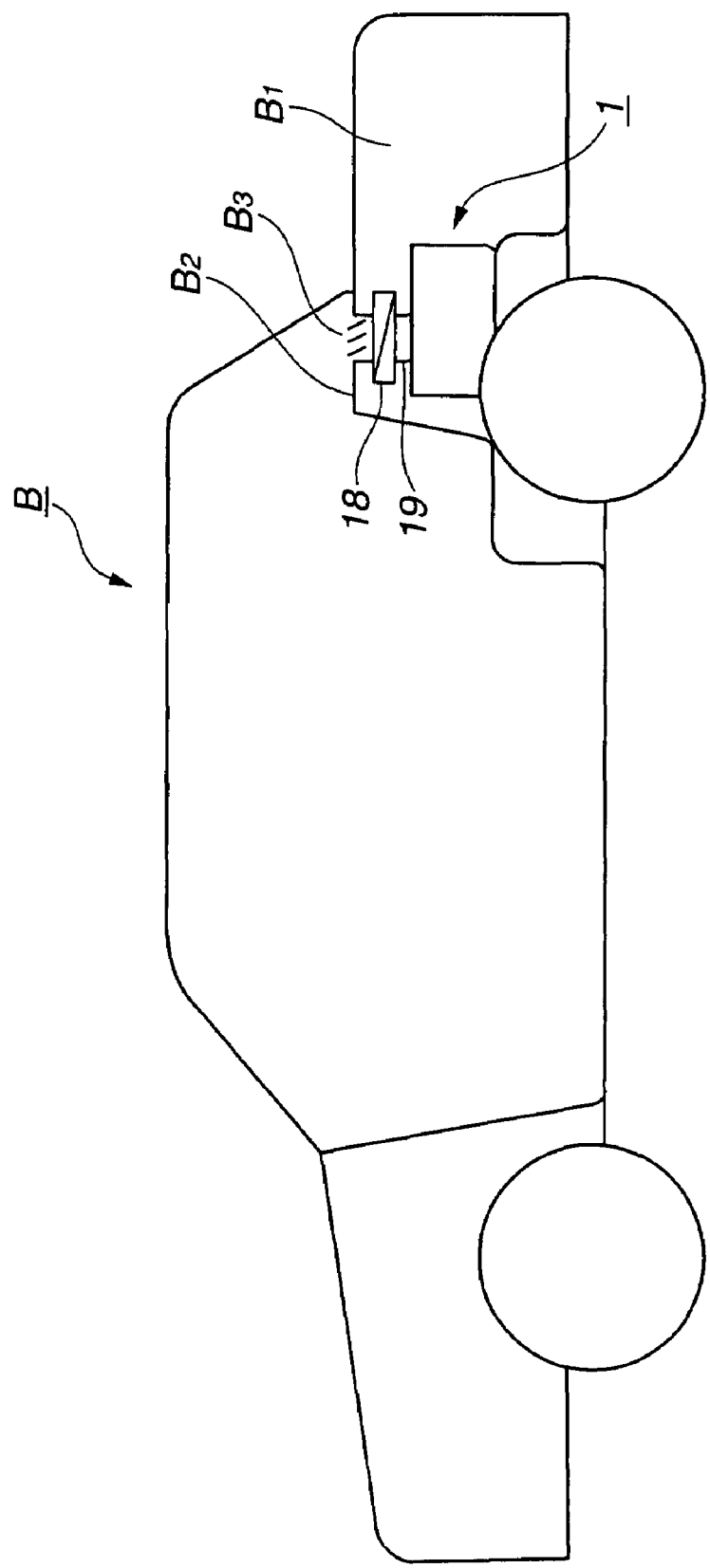
FIG. 5 is a conceptual view representing an example of an assembled cell unit to which the secondary battery capacity adjustment apparatus and method according to the present invention is applicable mounted in a vehicle.
Figure 6:
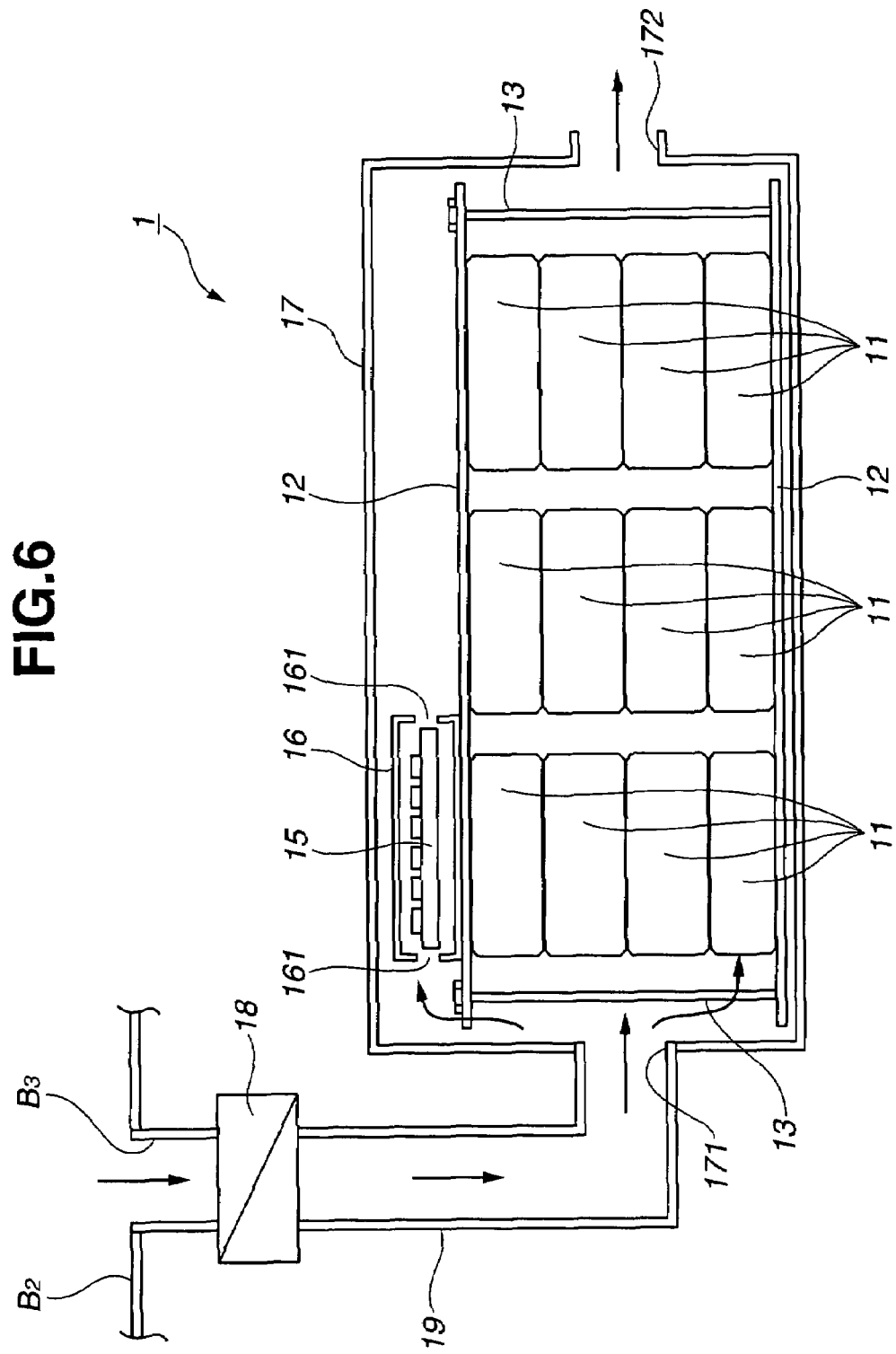
FIG. 6 is a cross sectional view representing an example of the assembled cell unit to which the secondary battery capacity adjustment apparatus according to the present invention is applicable.

FIG. 1 shows a schematic block diagram representing a preferred embodiment of a secondary battery capacity adjustment apparatus according to the present invention. FIG. 2 shows a flowchart representing an operation of the secondary battery capacity adjustment apparatus in the preferred embodiment shown in FIG. 1. FIG. 3 shows an explanatory view representing an example of a relationship between mounted positions of parts on a control board and priority orders of the secondary batteries to be capacity adjusted on the control board. FIG. 4 shows an explanatory view representing another example of a relationship between mounted positions of parts and the priority order of the secondary batteries to be capacity adjusted on the control board. FIG. 5 shows a conceptual view representing an example of an assembled cell unit to which the secondary battery capacity adjustment apparatus and method according to the present invention is applicable mounted in a vehicle. FIG. 6 shows a cross sectional view representing an example of the assembled cell unit to which the secondary battery capacity adjustment apparatus according to the present invention is applicable. FIG. 7 shows a perspective view of the control board to which the secondary battery adjustment apparatus according to the present invention is applicable. FIG. 8 shows a schematic block diagram of each of capacity adjustment sections shown in FIG. 1.

First, an example of a structure of the assembled cell unit to which the secondary battery capacity adjustment apparatus according to the present invention is applicable and an example of mounting the assembled cell unit in an automotive vehicle in the present invention will be explained below. An assembled cell unit 1 is mounted within a trunk room B1 of vehicle B as shown in FIG. 5. In the example shown in FIG. 5, an opening $B_3$ is formed on a rear parcel panel $B_2$ of vehicle B to introduce cold air within assembled cell unit 1. Air within a passenger compartment is introduced into assembled cell unit 1 from opening $B_3$ via a duct 19. It should be noted that the mounted position of assembled cell unit 1 in the present invention is not limited to the example shown in FIG. 5 but assembled cell unit 1 may be mounted within the passenger compartment, a bottom part of a floor within the vehicle body, an engine compartment, and so forth.

As shown in FIG. 6, assembled cell unit 1 in the preferred embodiment is structured in the following way. That is to say, a plurality of sheet-type thin secondary batteries are stacked and whose positive terminals are connected to negative terminals sequentially in series with each other to form a cell pack 11. A plurality of cell packs 11 are stacked (in this example, four) and their positive terminals and negative terminals are connected in series with each other. Then, cell packs 11 thus stacked are aligned in plural (in the case of FIG. 6, three). Furthermore, their respective positive and negative terminals located at both ends of respective cell packs 11 are connected in series with each other and upper and lower end plates 12, 12 are arranged on the upper and lower positions of laterally aligned cell packs 11 and are fixed to cell packs 11 by means of bolts 13, 13 or so forth.

In addition, a control board 15 to control respective secondary batteries 14 constituting the assembled cell unit 1 is attached onto upper end plate 12 and is housed within a casing 16 (secondary battery 14 itself is shown in FIG. 1). This control board is a printed circuit board on which electronic parts 151 such as integrated circuits to control respective secondary batteries 14 constituting the assembled cell unit 1 and resistors 152A (namely, capacity adjusting sections) to adjust respective capacities (residual capacities, namely, residual energies of the secondary batteries and, hereinafter, described merely as capacities) of corresponding secondary batteries are mounted.

FIG. 7 shows an outline of control board 15. On front and rear surfaces of a printed circuit board 153 on which wiring printed patterns are formed, integrated circuits (IC chips) 151 to control respective secondary batteries 14 and resistors 152A electrically connected in parallel to respectively corresponding secondary batteries 14 to be capacity adjusted for respectively corresponding secondary batteries 14 are mounted in forms of matrices, respectively. FIG. 7 shows twelve integrated circuits 151 and twelve resistors 152A for convenience' sake. In a case where assembled cell unit 1 is, for example, constituted by 60 (sixty) sheet-type secondary batteries 14, 60 resistors 152A and 60 integrated circuits 151 are mounted on printed circuit board 153 to perform the capacity adjustments for the respective secondary batteries. This state is shown in FIG. 1. In addition, FIGS. 3 and 4 show examples of mounting 21 (twenty one) integrated circuits 151, each integrated circuit 151 controlling two secondary batteries 14, 14 and 42 (forty two) resistors 152A, each resistor 152A performing the capacity adjustment of the corresponding one of 42 secondary batteries 14. It should be noted that a reference numeral 154 in FIGS. 3 and 4 denotes each of connectors on which input and output terminals to perform communications with an external equipment and to connect between each thin secondary battery 14 and each resistor 152A and each integrated circuit 151, a reference numeral 155 denotes an integrated circuit (IC chip) to perform an overall control of the assembled cell in the control printed circuit board (or printed circuit board) 153. FIG. 1, FIG. 3, and FIG. 7 do not mutually match the number of integrated circuits 151 and resistors 152A with one another. This is because according to the number of the secondary batteries, the numbers of the integrated circuits 151 and resistors 152A can variably be modified.

Referring back to FIG. 6, a plurality of cell packs 11, 11, - - - grasped with upper and lower end plates 12, 12 are housed in an assembled cell housing 17. An air intake port 171 through which air within a vehicle passenger compartment is introduced and an exhaust port 161 through which air introduced into assembled cell casing 17 is exhausted are formed in this assembled cell casing 17. A duct 19 on which a fan 18 is installed is coupled with intake port 171. An upper end of this duct 19 is connected to opening $B_3$ of rear parcel panel $B_2$ of vehicle B described above.

Since secondary battery 14 is heated during the charge and the discharge, fan 18 is operated to introduce air within the passenger compartment into assembled cell casing 17. Air introduced from intake port 171 cools secondary batteries 14 while mainly passing a clearances between mutually adjacent cell packs 11 and is exhausted from exhaust port 172. However, part of air functions to cool control board 15 installed on upper terminal plate 12. In this case, openings 161, 161 are formed on both ends in an air circulation direction of casing 16 to house control board 16 and, thus, the air is introduced into casing 16. Then, the capacity adjustment of each secondary battery 14 by means of capacity adjustment resistor 152A is carried out in the following way.

First, an electrical structure of assembled cell unit 1 which is an object of capacity adjustment apparatus and method according to the present invention will be described below with reference to FIGS. 1 and 8.

Assembled cell unit 1 in this embodiment is constituted by a plurality of secondary batteries connected in series with each other, both ends thereof being connected with a vehicle load 2 such as a starter motor, a drive motor for an electric vehicle, or so forth.

On the other hand, voltage detection sections 151A to detect voltage values of respective secondary batteries 14 are installed in respective secondary batteries 14. In addition, capacity adjustment sections 152 to adjust capacities of respective secondary batteries 14 are connected across respective secondary batteries 14. Each capacity adjustment section 152 (refer to FIG. 8) includes: a resistor 152A connected in parallel to each of secondary batteries 14; a switching device 151C connected in series with this resistor 152A; and a capacity adjustment control section 151B configured to control an on-and-off of this switching device 151C on the basis of a command issued from a control unit 155B and to transmit a voltage across the corresponding secondary battery 14 detected at voltage detection section 151. Each of voltage detection sections 151A, each of switching devices 151C, and each of capacity adjustment control sections 151B are incorporated into an integrated circuit 151, for example, as shown in FIGS. 3 and 7. It should be noted that an isolation circuit 155A shown in FIG. 1 is an isolation transmission circuit to perform a transmission of signals between capacity adjustment control sections 151B of respective capacity adjustment sections 152 installed respectively on the plurality of secondary batteries 14 and control unit 155B, while electrically isolating the signals using, for example, photo-couplers. Isolation circuit 155A is incorporated into an integrated circuit 155 shown in FIGS. 3, 4, and 7. It should be noted that switching device 151C may be a switching device (or element) such as a transistor, a MOS-FET (Metal Oxide Semiconductor-Field Effect Transistor), or an IGBT (Insulated Gate Bipolar Transistor) or may be a mechanical switch such as a relay.

In the embodiment described above, a temperature sensor 3 to detect an actual temperature of a corresponding one of integrated circuits 151 mounted in plural on control board 15 is installed at an adjacent portion of integrated circuits 151 shown in FIGS. 3, 4, and 7, actual temperature Tr detected by means of the plurality of temperature sensors 3 being transmitted to control unit 155B.

The number and arrangement of temperature sensors 3 are not limited to the embodiment described above. Temperature sensor 3 may be installed at a center X of a plurality of integrated circuits 151 shown in FIG. 7 or a plurality of sensors 3 may be installed at positions denoted by Y at predetermined intervals between integrated circuits 151. A grasping of actual temperature Tr during the adjustment of the capacity as will be described later becomes more accurate.

It should be noted that a reference numeral 4 shown in FIG. 1 denotes a total voltage sensor to detect a whole voltage value of assembled cell unit 1 and a reference numeral 5 denotes a current sensor to detect a current flowing through whole assembled cell unit 1.

Especially, in the embodiment, a priority order of secondary batteries 14 to be capacity adjusted is determined in accordance with the mounted position of each of resistors 152A on control board 15. As one example of "in accordance with the mounted position of resistor 152A on control board 15", the priority order of one of secondary batteries 14 which corresponds to the position difficult to produce a thermal influence on other resistors 152A is set to be high. That is to say, the capacity adjustment is carried out in the following way. A current is caused to flow through corresponding resistor 152A from corresponding secondary battery 14 so that an electric power of corresponding secondary battery 14 is consumed by corresponding resistor 152A. Thus, the capacity of each corresponding secondary battery 14 is reduced to a target capacity. Thus, the capacity of each secondary battery 14 is adjusted. Thereby, for example, the capacities of respective secondary batteries 14 are uniformed. Therefore, as a result of the current flow through resistor 152A during the capacity adjustment, corresponding resistor 152A is thermally generated (heated). Thus, temperatures of electronic parts 151 and 155 mounted on control board 15 are locally raised and an influence on durability may be exerted. However, heated resistors 152A are selected in an order from that difficult to produce a heat (thermal) influence on the other resistors and corresponding resistor 152A is thermally generated to prevent a local temperature rise. Consequently, the thermal influence on electronic parts 151, 155 mounted on control board 15 can be minimized.

For example, suppose that 21 (twenty one) resistors 152A are mounted on control board 15 shown in FIG. 3. As shown in graphs of FIG. 3, each of secondary batteries 14 (the secondary batteries connected in parallel to resistors 152A mounted at the four corners of control board 15) corresponding to resistors 152A mounted at four corners of control board 15 from among resistors 152A mounted in the matrix form has a highest priority order. The priority order of one of secondary batteries corresponding to resistor 152A located at an approximately center of control board 15 has a lowest priority order. Such a determination of the priority order according to the mounted position as described above is made for each layout of control board 15 and is stored in a memory of control unit 155B as an arrangement coefficient Kn of respective secondary batteries 14.

In addition to the mounted positions of resistors 152A corresponding to selected secondary batteries 14 during the capacity adjustment, capacity adjustment values of respective secondary batteries 14 have a correlation to heat generation quantities of resistors 152A. When one of secondary batteries 14 to be finally capacity adjusted is selected, the priority of the capacity adjustment by making capacity adjustment quantity Vn of each of secondary batteries 14 multiplied by an arrangement coefficient Kn on which the mounted position is reflected is determined.

Next, a capacity adjustment method in the embodiment described above will be described.

When electronic parts such as integrated circuits 151, 155 mounted on control board 15 are exposed to a high temperature, durability thereof is reduced. Hence, a limit temperature is prescribed according to a grade of the corresponding electronic part. In the following explanation, this limit temperature Tm is pre-stored in a memory of control unit 155B as 70° C. This limit temperature Tm indicates an unfavorable temperature when the corresponding electronic part is exposed to the limit temperature. In other words, a quality of the corresponding electronic part is guaranteed unless the temperature of the corresponding electronic part exceeds the limit temperature. Herein, the capacity adjustments for respective secondary batteries 14 are supposed to be executed to prevent temperatures of integrated circuits 151, 155 from exceeding limit temperature of 70° C. due to a thermal influence from capacity adjustment sections (resistors) 152A.

As shown in FIG. 2, control unit 155B determines whether the present time is in a capacity adjustment mode at a step ST10. A timing of this capacity adjustment is not specifically limited but, for example, during an activation of the vehicle, during a vehicular stop, or so forth. Of course, it is possible to carry out the capacity adjustment during a vehicle traveling.

At a step ST20, control unit 155B inputs voltages of respective secondary batteries 14 detected by means of respectively corresponding voltage detection sections 151A of respective secondary batteries 14 via respective capacity adjustment control sections 151B and calculates the capacity adjustment quantities required for respective secondary batteries 14 on the basis of the inputted voltage values. That is to say, it is generally known that a correlation between the voltage value of each of secondary batteries 14 and the capacity of the corresponding secondary battery 14 is present. Hence, on the basis of the voltage values, the respective capacity adjustment quantities are calculated. A method of calculation for the capacity adjustment quantities of respective secondary batteries 14 calculated herein is not specifically limited. For example, the capacity adjustment values for respective secondary batteries 14 may be determined from a deviation between an average value of the voltage values of all secondary batteries 14 and a voltage value of one of secondary batteries 14 to be capacity adjusted or may be determined from the deviation using a maximum value of the voltage values of the plurality of secondary batteries 14 and a minimum value thereof as described in the Japanese Patent Application Publication No. 2003-284253 (published on Oct. 3, 2003) described in the BACKGROUND OF THE INVENTION.

Next, if capacity adjustment quantity values Vn of respective secondary batteries 14 are calculated at step ST20, control unit 155B, at a step ST30, determines a priority (order) by making each of capacity adjustment values Vn of secondary batteries 14 multiplied by a characteristic value of each of the mounted positions of corresponding resistors 152A on control board 15.

Next, control unit 155B detects actual temperature Tr of control board 15 by means of temperature sensor 3 at a step ST40. Since control unit 155B previously stores (pre-stores) a value of 70° C. which is limit temperature Tm, control unit 155B calculates a difference between actual temperature Tr of control board 15 and limit temperature Tm at a step ST50.

If capacity adjustment quantities of respective secondary batteries 14 are determined at step ST20, control unit 155B calculates a total sum of the capacity adjustment quantities at a step ST60 to calculate the total sum of the capacity adjustment quantities required for whole assembled cell unit 1. It should be noted that steps ST20 and ST30 and steps ST40, ST50, and ST60 can be executed in parallel with each other.

The temperature difference between actual temperature Tr of control board 15 and limit temperature Tm corresponds to an amount of heat allowed in the capacity adjustment in terms of temperature. On the other hand, the total sum of the capacity adjustment quantities is a value of the amount of heat generated in the capacity adjustment in terms of electric power. If these dimensions are united, the capacity adjustment quantities that can be performed in the range of the temperature difference can be predicted. Specifically, if a capacity adjustment quantity required in a certain secondary battery 14 is W, this capacity adjustment quantity causes a current to flow through its capacity adjustment resistor 152A, its energy W can be consumed. The capacity of this certain secondary battery 14 can be reduced to a target voltage value. Since a resistance value of resistor 152A is known, a heat generation quantity by means of resistor 152A can be determined. In addition, how degree of temperature of control board 15 is raised due to the heat generation from resistor 152A can previously be derived by a calculation or empirically. Hence, if the temperature difference between actual temperature Tr of control board 15 and limit temperature Tm is determined, which order and how many secondary batteries are simultaneously capacity adjusted within this temperature difference range can be determined.

At step S60, control unit 155B determines the number of secondary batteries 14 to simultaneously be capacity adjustable on the basis of temperature difference (Tm−Tr) and the total sum of the capacity adjustment quantities determined at the above-described steps. In a case where the temperature difference is large and the total sum of the capacity adjustment quantities is small, all secondary batteries 14 can simultaneously be capacity adjusted. However, in a case where the temperature difference is small and in a case where the total sum of capacity adjustment quantities is large, there is a possibility of exceeding limit temperature Tm of control board 15 if the capacity adjustments for all of secondary batteries 14 in assembled cell unit 1 are simultaneously executed. Hence, in these cases, with the number of secondary batteries 14 limited, the capacity adjustment is started and if the capacity adjustments for some secondary batteries 14 are ended, the capacity adjustments of the remaining secondary batteries are sequentially carried out.

Then, at the next step ST70, an order is given to each of secondary batteries 14 to be capacity adjusted. At this time, the secondary batteries to be capacity adjusted are selected in an order from higher priority order secondary batteries.

If the number of secondary batteries 14 to simultaneously be capacity adjusted and the order of secondary batteries 14 to be capacity adjusted are determined, the capacity adjustment for each of selected secondary batteries 14 is started at a step ST80. This operation for each of the selected secondary batteries 14 is executed in such a way that a current is caused to flow through resistor 152A for a predetermined time by transmitting a capacity adjustment signal (viz., a command to drivingly turn on a switching device 151C) for the predetermined time to capacity adjustment control section 151B of corresponding capacity adjustment section 152 to turn on switching device 151C for the predetermined time from control unit 151.

Next, at a step ST90, control unit 155B monitors whether there is one or more of secondary batteries 14 at which the capacity adjustments have been ended. If there is one of secondary batteries 14 at which the capacity adjustment is ended, the routine goes to a step ST100 at which control unit 155B determines whether the capacity adjustments for all secondary batteries 14 have been ended. If remaining one or more of secondary batteries 14 for which the capacity adjustments are not carried out (No) at step ST100, the routine goes to a step ST110 at which control unit 151 selects the subsequent order (priority order) secondary battery 14 and the routine returns to step ST80 at which the capacity adjustment for the corresponding one of the selected secondary batteries is started. Then, this routine of steps ST80, ST90, ST100, and ST110 are repeated. After the end of the capacity adjustments for all secondary batteries 14, this processing is ended.

As described above, since, in this processing shown in FIG. 2, the priority order of secondary batteries 14 to be capacity adjusted is determined in accordance with the mounted position of resistor 152A which is the heat generation source, a local high temperature generation portion can be prevented from occurring. In addition, the temperature over whole control board 15 is uniformly distributed. The capacity adjustment can efficiently be executed in a short time without overheat of control board 15.

It should be noted that, as shown in FIG. 6, air stream (cooling wind) within the passenger compartment of vehicle B is caused to flow on surfaces of control board 15 although it is a course of nature, as described above. According to the present invention, the priority order of secondary batteries 14 to be capacity adjusted can be determined with this cooling medium taken into consideration in a case where a medium exerting a cooling effect on control board 15 is caused to flow on control board 15. FIG. 4 shows another example of a relationship between mounted positions of parts 151, 152, and 155 on control board 15 according to the present invention and the priorities (priority order) of the secondary batteries to be capacity adjusted. The cooling wind from the passenger compartment of vehicle B is supposed to flow from a right direction in FIG. 4 to a left direction in FIG. 4.

In the above-described embodiment, the priority order is determined only from the mounted positions of resistors 152A on control board 15 without consideration of flow of cooling wind from the passenger compartment of vehicle B. However, in this example, the priority order of one of secondary batteries 14 which corresponds to resistor 152A which is difficult to produce a thermal (heat) influence on the other resistors on the basis of the cooling wind from the passenger compartment and the mounted position of resistor 152A is set to be high.

For example, suppose 42 (forty two) resistors 152A mounted on control board 15 shown in FIG. 4. As shown in graphs of FIG. 4, the priorities of the secondary batteries 14 to be capacity adjusted with respect to a vertical direction of control board 15 from among resistors 152A mounted in the matrix form on control board 15 are set in the following way. That is to say, two of secondary batteries 14 corresponding to respective two resistors 152A mounted at both upper and lower ends of control board 15 are set to have higher priorities and some of secondary batteries 14 which corresponds to resistors 152A mounted at a center of control board 15 are set to have lower priorities. Whereas, with respect to a left-and-right direction in FIG. 4, the priorities of secondary batteries 14 to be capacity adjusted which correspond to resistors 152A mounted at a downwind of the cooling wind, viz., at a left end position of control board 15 are set to be higher since the heat generated from these resistors is caused flow in the left direction in FIG. 4 and can be difficult to produce the thermal influence on other resistors 152A and the priorities of the secondary batteries which correspond to resistors 152A mounted at a right end position of control board 15 are set to be lower. The determination of the priorities in accordance with the mounted position and the flow of the cooling wind is made for each layout of control board 15 and is previously stored in a memory of control unit 155B as arrangement coefficients Kn of their respectively corresponding secondary batteries 14.

In this way, even though, in addition to the mounted positions of resistors 152A which are the heat generation sources, the priorities (priority order) of secondary batteries to be capacity adjusted are determined in accordance with the flow direction of the cooling wind, the generation of the local high temperature portion can be prevented. In addition, the temperature is uniformly distributed over the whole part of control board 15. The capacity adjustments for respective secondary batteries can be executed efficiently in a short time without overheat of control board 15.

It should be noted that the above-described embodiment are described in order to facilitate a better understanding of the present invention and do not limit the scope of the present invention. Hence, each essential element disclosed in the above-described embodiment includes all design modifications and equivalents belonging to the scope of the present invention. This application is based on a prior Japanese Patent Application No. 2006-111896. The entire contents of a Japanese Patent Application No. 2006-111896 with a filing date of Apr. 14, 2006 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A secondary battery capacity adjustment apparatus for an assembled cell unit, the assembled cell unit including:
    a plurality of secondary batteries; and
    a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment apparatus comprising:
    a priority order determining section configured to determine a priority order of the secondary batteries to be residual capacity adjusted in accordance with a mounted position of the capacity adjusting section corresponding to one of the secondary batteries to be residual capacity adjusted on the control board; and
    a secondary battery capacity adjusting section configured to have the electric power of each of the secondary batteries consumed by the corresponding capacity adjusting section in accordance with the determined priority order to adjust a residual capacity of each of the secondary batteries.

2. The secondary battery capacity adjustment apparatus as claimed in claim 1, wherein the priority order determining section determines a high priority order for one of the secondary batteries which corresponds to the capacity adjusting section mounted at a position difficult to produce a thermal influence on the other capacity adjusting sections.

3. The secondary battery capacity adjustment apparatus as claimed in claim 1, wherein the priority order determining section determines a high priority order for one of the secondary batteries corresponding to one of the capacity adjusting sections mounted at a position of the control board at a downwind side of an air stream flowing on the control board.

4. The secondary battery capacity adjustment apparatus as claimed in claim 1, wherein the capacity adjusting sections are mounted on a main surface of the control board approximately in a matrix form.

5. The secondary battery capacity adjustment apparatus as claimed in claim 1, wherein the secondary battery capacity adjustment apparatus further comprises: a temperature detecting section configured to detect an actual temperature of the control board before the residual capacity adjustment on the control board; a temperature difference calculating section configured to calculate a temperature difference between the actual temperature detected by the temperature detecting section and a predetermined limit temperature of the control board; a total sum calculating section configured to calculate a total sum of capacity adjustment quantities of the respective secondary batteries; and a calculating section configured to calculate the number of the secondary batteries to be simultaneously residual capacity adjusted on the basis of the temperature difference and the total sum of the residual capacity adjustment quantities.

6. The secondary battery capacity adjustment apparatus as claimed in claim 1, wherein each of the capacity adjusting sections comprises a resistor electrically connected in parallel to the corresponding one of the secondary batteries and configured to consume the electric power with an electric current from the corresponding one of the secondary batteries supplied.

7. A secondary battery capacity adjustment method for an assembled cell unit, the assembled cell unit including:

a plurality of secondary batteries; and a control board on which a capacity adjusting section is mounted, the capacity adjusting section being installed to correspond to each of the secondary batteries and configured to consume an electric power of a corresponding one of the secondary batteries to adjust a residual capacity of the corresponding one of the secondary batteries, the secondary battery capacity adjustment method comprising:

determining a priority order of the secondary batteries to be residual capacity adjusted in accordance with a mounted position of the capacity adjusting section corresponding to one of the secondary batteries on the control board; and having the electric power of each of the secondary batteries consumed by the corresponding capacity adjusting section in accordance with the determined priority order to adjust a residual capacity of each of the secondary batteries.

8. The secondary battery capacity adjustment method as claimed in claim 7, wherein, at the determination of the priority order of the secondary batteries to be residual capacity adjusted in accordance with the mounted position of the capacity adjusting section, a high priority order for one of the secondary batteries corresponding to the capacity adjusting section mounted at a position difficult to produce a thermal influence on the other capacity adjusting sections is determined.

9. The secondary battery capacity adjustment method as claimed in claim 7, wherein, at the determination of the priority order of the secondary batteries to be residual capacity adjusted in accordance with the mounted position of the capacity adjusting section, a high priority order for one of the secondary batteries corresponding to one of the capacity adjusting sections which is mounted at a position of the control board at a downwind side of an air stream flowing on the control board is determined.

10. The secondary battery capacity adjustment method as claimed in claim 7, wherein the secondary battery capacity adjustment method further comprises: detecting an actual temperature of the control board before the capacity adjustment on the control board; calculating a temperature difference between the detected actual temperature and a predetermined limit temperature of the control board; calculating a total sum of residual capacity adjustment quantities of the respective secondary batteries; and calculating the number of the secondary batteries to simultaneously be residual capacity adjusted on the basis of the temperature difference and the total sum of the residual capacity adjustment quantities.

* * * * *